United States Patent [19]

Strader

[11] 4,131,296
[45] Dec. 26, 1978

[54] SELF-DAMPING TRAILER HITCH
[75] Inventor: Don S. Strader, Marietta, Ga.
[73] Assignee: Motor Wheel Corporation, Lansing, Mich.
[21] Appl. No.: 867,690
[22] Filed: Jan. 9, 1978
[51] Int. Cl.² .............................................. B60D 1/00
[52] U.S. Cl. .................................... 280/485; 280/477
[58] Field of Search .............. 280/477, 483, 484, 485, 280/488, 489, 504, 506, 508, 514, 515

[56] References Cited
U.S. PATENT DOCUMENTS

| | | | |
|---|---|---|---|
| 2,011,817 | 8/1935 | Littlefield | 280/485 |
| 2,136,440 | 11/1938 | Hufferd | 280/485 |
| 2,736,575 | 2/1956 | Gebhart | 280/477 |
| 3,596,925 | 8/1971 | Richie | 280/477 |
| 3,694,006 | 9/1972 | Good | 280/507 |
| 3,961,813 | 6/1976 | Thomas | 280/485 |

Primary Examiner—Joseph F. Peters, Jr.
Assistant Examiner—R. Schrecengost
Attorney, Agent, or Firm—Barnes, Kisselle, Raisch & Choate

[57] ABSTRACT

A trailer hitch comprising a draw tongue adapted to extend from a trailer, a handle mounted for pivotal movement above the draw tongue, and a cable attached at one end to the handle and extending downwardly through the draw tongue to a hitch coupler which is carried for bodily movement upwardly and downwardly as a function of pivotal motion of the handle. A drawbar adapted to be attached to a towing vehicle is slotted to receive the hitch coupler and recessed to capture the coupler as the latter is moved upwardly by pivotal movement of the handle. A resilient bushing of elastomeric material is captured in compression between the drawbar and the draw tongue resiliently to permit relative movement in all planes and to damp road shock therebetween.

12 Claims, 4 Drawing Figures

SELF-DAMPING TRAILER HITCH

The present invention is directed to a trailer hitch for releasably coupling a draft vehicle to a drawn vehicle.

An object of the present invention is to provide a self-damping trailer hitch which permits limited relative movement between the draft and drawn vehicles, which resiliently tends to align the drawn vehicle behind the draft vehicle and which thereby cushions road shocks between the vehicles.

Another object of the invention is to provide a trailer hitch of the above-described type which is self-locking in the hitched or coupled position.

A further object of the invention is to provide a trailer hitch which does not depend on carrying a portion of the trailer load on the drawbar of the draft vehicle for proper and safe function. Such loading of the draft vehicle is known to cause many difficulties such an handling, headlight alignment and other problems.

The invention, together with additional objects, features and advantages thereof, will be best understood from the following description, the appended claims and the accompanying drawings in which:

Figure 1:
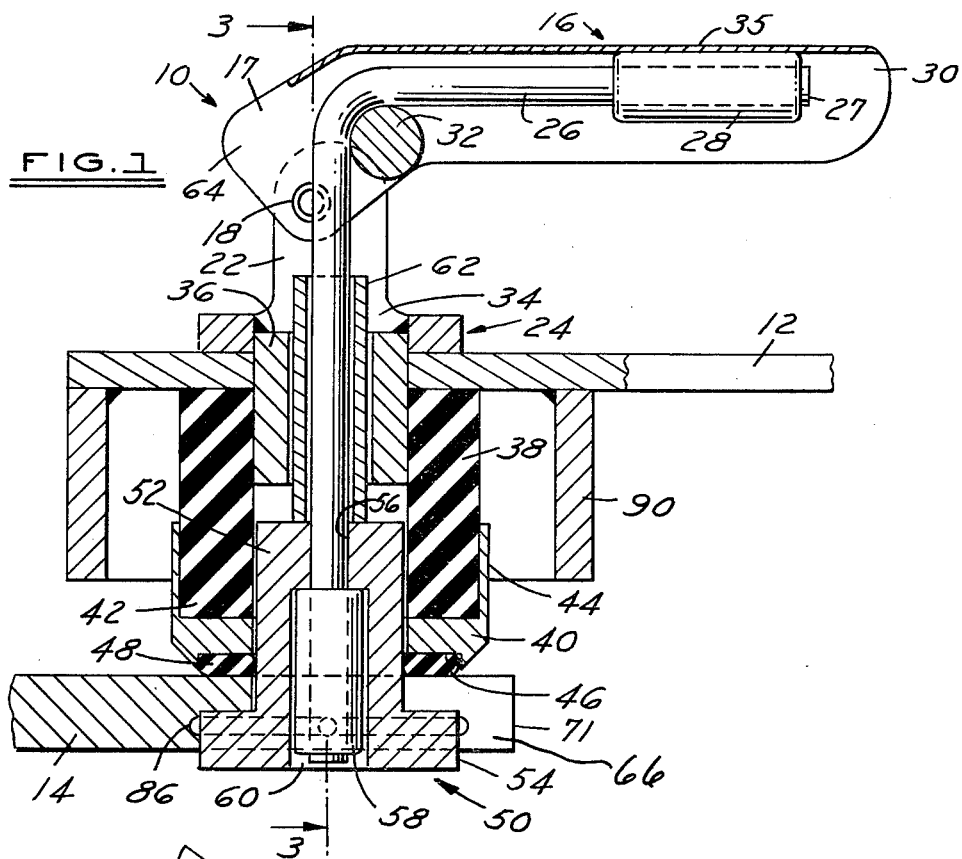
FIG. 1 is a sectioned elevational view of a presently preferred embodiment of the trailer hitch provided by the invention in the hitched or coupled condition.

Referring to the drawings, a presently preferred embodiment 10 of the trailer hitch provided by the invention is illustrated as comprising a draw tongue 12 adapted to be attached to a drawn vehicle (not shown) such as a tractor or automobile. An inverted elongated channel-shaped handle 16 is pivotally carried at one end 17 by shoulder screws 18 (FIG. 3) between upstanding ears 20, 22 of a bracket 24 fixedly mounted to draw tongue 12. A collar 28 is affixed to one end 27 of a stranded cable 26 and mounted as by welding internally of handle 16 adjacent a free end 30 of the handle remote from pivot screws 18. A shoulder stud 32 internally bridges handle 16 and is spaced longitudinally of handle end 17 between pivot screws 18 and cable end collar 28, as best seen in FIG. 1.

Cable 26 extends from collar 28 past shoulder 32 between the shoulder and the bight 35 of handle 16, and then downwardly through an opening 34 in drawbar 12 and bracket 24. A collar 36 surrounds cable 26 and is mounted to bracket 24 to extend downwardly in opening 34 through draw tongue 12. A hollow resilient bushing 38 of elastomeric material, such as neoprene, is adhered to collar 36 externally thereof beneath draw tongue 12 generally coaxially with cable 26. A collar 40 is adhered to the lower end 42 of bushing 38 remote from draw tongue 12, and includes a skirt 44 extending upwardly and externally surrounding sleeve end 42. A downwardly opening internal shoulder 46 is formed in collar 40 and a thrust bearing 48 is retained therein.

A hitch coupler 50 is carried for bodily movement by cable 12, and includes a generally cylindrical body portion 52 and a shoulder portion 54 extending radially outwardly of body portion 52 at an end thereof remote from draw tongue 12. Cable 26 extends through an axial aperture 56 in body portion 52 and terminates in a cable end collar 58 which is loosely received in a generally cylindrical counterbore 60 opening downwardly from aperture 56. A sleeve 62 surrounds cable 26 and is loosely received thereon above body portion 52. A cam nose 64 on handle end 17 cooperates with sleeve 62 to unlock hitch coupler 50 in a manner set forth hereinafter.

Figure 2:
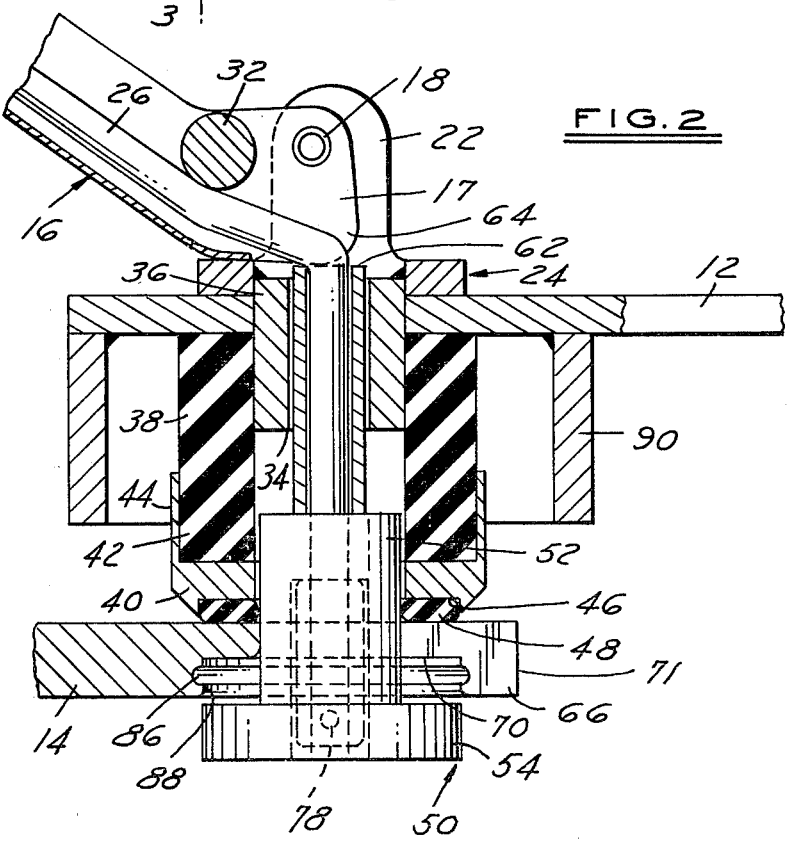
FIG. 2 is an elevational view similar to that of FIG. 1 showing the hitch in the uncoupled condition.
Figure 3:
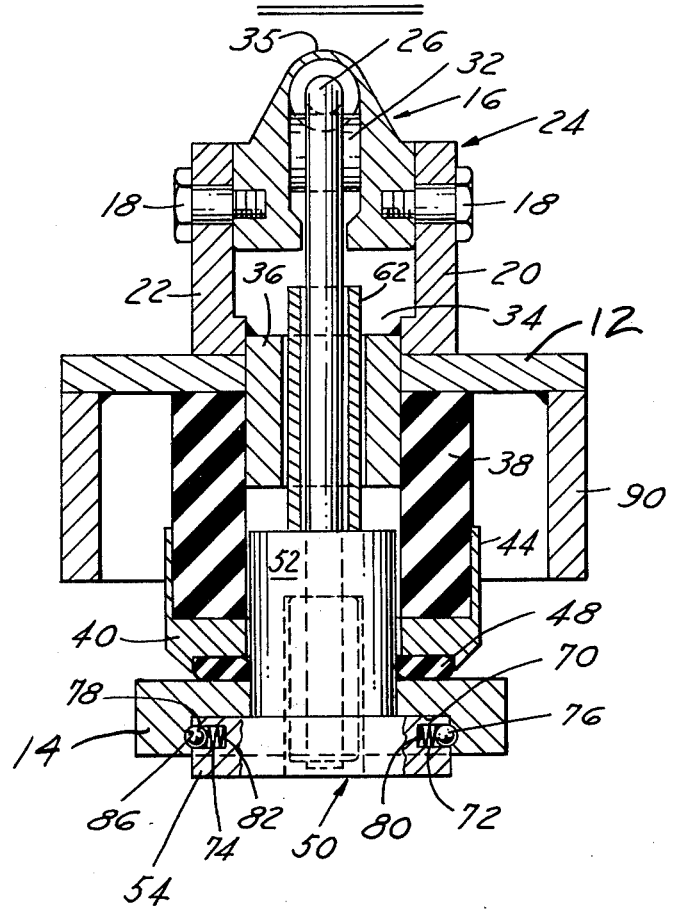
FIG. 3 is a sectional view taken along the line 3—3 in FIG. 1.
Figure 4:
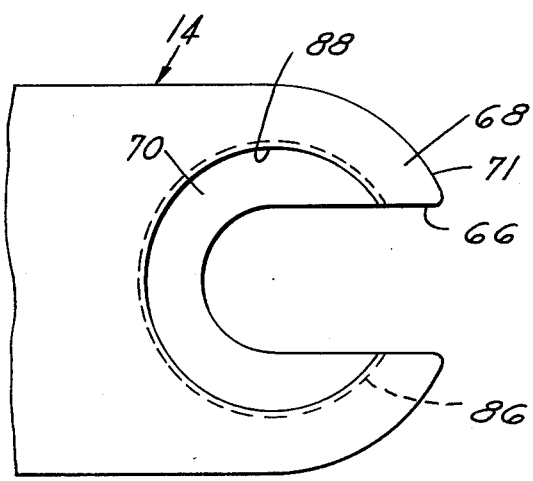
FIG. 4 is a bottom view of the drawbar in accordance with the invention adapted to be attached to the draft vehicle.

A downwardly opening cup-shaped recess 70 is provided in drawbar 14 at an end 68 thereof remote from the draft vehicle (not shown). A slot 66 communicates recess 70 with an end edge 71 of drawbar 14 (FIGS. 2 and 9). Referring to FIG. 3 shoulder portion 54 of coupler 50 includes a pair of diametrically opposed outwardly directed cylindrical openings 72, 74 in which are respectively disposed balls 76, 78 biased radially outwardly by the coil spring 80, 82. A detent recess or groove 86 is provided in the radially inwardly facing wall 88 of cup-shaped recess 70 and cooperate with balls 76, 78 to provide a ball-and-detent locking mechanism to retain coupler 50 withing recess 70. An annular safety ring 90 surrounds sleeve 38 and is radially spaced therefrom to limit lateral displacement of the sleeve.

In operation, handle 16 is initially disposed in the open position illustrated in FIG. 2 wherein cable 26 is slack and coupler 50 depends therefrom in a lowered position spaced below bearing 48 by a distance slightly greater than the vertical thickness of drawbar 14. In this position, coupler body portion 52 may be moved radially into drawbar slot 66 as by pulling the trailer (not shown) toward the tractor in the usual manner until body portion 52 is coaxial with cup-shaped recess 70 and coupler shoulder portion 54 is spaced downwardly therefrom, i.e., to the position illustrated in FIG. 2. Handle 16 is then pivoted about the axis of screws 18 from the position illustrated in FIG. 2 and toward that illustrated in FIG. 1, during which motion nose 64 is first disengaged from the upper end of sleeve 62 and then cable 26 is drawn over shoulder 32 to pull coupler 50 upwardly into recess 70. Further pivotal motion of handle 16 pulls coupler 50 and drawer 14 conjointly upwardly thereby axially compressing bushing 38 and bearing 48, the latter being forced into firm engagement with the upper surface of drawbar 14.

An important feature of the present invention best appreciated with reference to FIG. 1 lies in the fact that the pivotal axis of handle 16 through screws 18 and the position of shoulder 32 within the channel-shaped handle lie on either side of the axis of the downwardly extending portion of cable 26 when the hitch is in locked position. In this over-centered condition, the resilient forces in compressed bushing 38 pull downwardly on shoulder 32 through cable 26 in the direction of hitch closure, thereby rendering the hitch mechanism self-locking. The ball-and-detent locking mechanism 72–86 (FIG. 3) acts as a backup to the overcenter locking feature previously described to protect against hitch separation in the event of cable fracture.

To unlatch the hitch mechanism, handle 16 is pivoted from the position illustrated in FIG. 1 to that illustrated in FIG. 2 to first slacken cable 26 and then bring cam nose 64 into engagement with the follower sleeve 62. During further pivotal handle motion, nose 64 pushes downwardly on sleeve 62 and thereby on coupler 50 to push coupler 50 axially downwardly out of engagement with drawbar recess 70. Draw tongue 12 and drawbar 14 may then be separated.

During travel over a road surface, bushing 38 resiliently permits relative motion between draw tongue 12 and drawbar 14 caused by road shocks, slight turns, lateral sway, etc. More specifically, rotation of draw tongue 12 relative to drawbar 14 about the axis of bushing 38 caused by turning of a corner or by lateral trailer sway results in resilient torsional forces in the bushing and in the thrust bearing 48. Similarly, relative movement of draw tongue 12 and drawbar 14 in a direction perpendicular to the axis of bushing 38 caused by road shocks or by sudden acceleration of the tractor for example, causes resilient lateral bending of the bushing. Again, bushing 38 tends to restore the desired relative position between the draw tongue and drawbar. Collar skirt 44 and ring 90 cooperate to limit extreme bending of bushing 38 and to protect the bushing from abrasion. Thus, it will be appreciated that the trailer hitch provided by the present invention, the preferred embodiment of which has been described in detail hereinabove, is both self-damping and self-locking in the hitched condition.

The invention claimed is set forth in the appended claims wherein positional or directional adjectives such as "upward", "downward", etc. are employed by way of description, and not by way of limitation, with reference to the orientation of the structure as viewed in FIGS. 1-4 of the drawing, it being understood that the hitch may be inverted or otherwise re-oriented without altering the functional interrelationship of the elements as claimed.

The invention claimed is:

1. A trailer hitch for releasably coupling a draft vehicle to a drawn vehicle comprising a draw tongue adapted to extend from one of said draft and drawn vehicles; coupling means carried for bodily movement beneath said draw tongue; means for selectively bodily moving said coupling means upwardly and downwardly beneath said draw tongue; and a drawbar adapted to extend from the other of said vehicles including means defining a laterally opening slot adapted to receive said coupling means in a downward position of said coupling means and means defining a downwardly opening recess communicating with said slot and adapted to capture a portion of said coupling means as the latter is drawn upwardly by said moving means, said coupling means thereby coupling said drawbar to said draw tongue in an upward captured position of said coupling means.

2. The trailer hitch set forth in claim 1 further comprising means for releasably locking said coupling means in said upward captured position.

3. The trailer hitch set forth in claim 2 wherein said moving means comprises a handle pivotally carried above said draw tongue between said handle means and said coupling means to move said coupling means upwardly and downwardly as a function of pivotal motion of said handle.

4. The trailer hitch set forth in claim 3 wherein said handle is pivotally mounted at one end to said draw tongue and includes a shoulder adjacent said one end, and wherein said means extending between said handle and said coupling means includes a flexible tension element such as a cable attached at one end to said handle at a point spaced from said one end and coupled at the other end to said coupling means, said handle being pivotable between a first position wherein said cable is slack such that said coupling means is in said downward position and a second position wherein said cable is drawn over said shoulder to pull said coupling means into said upward captured position in said drawbar recess.

5. The trailer hitch set forth in claim 4 wherein said means extending between said handle and said coupling means further comprises cam means on said handle adjacent said one end, and follower means extending between said handle and said coupling means such that said cam means cooperates with said follower means to push said coupler means toward a release position as said handle is pivoted between said second position to said first position.

6. The trailer hitch set forth in claim 4 further comprising resilient bushing means surrounding said cable means in compression between said draw tongue and said drawbar in said second position of said handle means.

7. The trailer hitch set forth in claim 6 wherein said shoulder is disposed laterally between said one end of said handle and said one end of said cable such that compression forces in said resilient bushing means tend to retain said handle in said second position.

8. The trailer hitch set forth in claim 1 further comprising resilient bushing means carried by said draw tongue and adapted to be compressed between said drawbar and said draw tongue as said coupling means is drawn upwardly by said moving means.

9. A trailer hitch for releasably coupling a draft vehicle to a drawn vehicle comprising a draw tongue adapted to extend from one of said draft and drawn vehicles, a handle mounted for pivotal movement above said draw tongue, cable means attached at one end to said handle and extending downwardly through said draw tongue, coupling means carried at the other end of said cable means for bodily movement upwardly and downwardly beneath said draw tongue as a function of pivotal motion of said handle, a drawbar adapted to be mounted to the other of said draft and drawn vehicles and including at one end of said drawbar remote from said other vehicle first means forming an outwardly opening slot and second means forming a downwardly directed recess in said drawbar, said coupling means being received laterally into said slot and movable upwardly into said recess, and a resilient bushing carried beneath said draw tongue surrounding said cable and adapted resiliently to couple said draw tongue to said drawbar in compression as said coupling means and said drawbar are drawn upwardly by said handle.

10. The trailer hitch set forth in claim 9 wherein said handle comprises an elongated channel pivoted at one end to said draw tongue, means spaced from said one end attaching said cable internally of said channel and a shoulder disposed across said channel adjacent said one end, said cable being drawn over said shoulder in one pivotal position of said handle to pull said coupling means upwardly into said recess, compression forces in said bushing tending to pull said cable end shoulder downwardly and thereby to hold said handle in said one position.

11. The trailer hitch set forth in claim 10 wherein said coupling means and said recess include opposed radially directed surfaces, and wherein said hitch further comprises ball-and-detent latch means disposed in said opposed surfaces for retaining said coupling means in engagement with said drawbar.

12. The trailer hit set forth in claim 10 further comprising protective means disposed on said draw tongue around said bushing in radially spaced relation thereto, and means on said bushing to protect said bushing from abrasion by said protective means upon lateral bending of said bushing.

* * * * *

UNITED STATES PATENT AND TRADEMARK OFFICE
CERTIFICATE OF CORRECTION

PATENT NO. : 4,131,296
DATED : Dec. 26, 1978
INVENTOR(S) : Don S. Strader

It is certified that error appears in the above-identified patent and that said Letters Patent are hereby corrected as shown below:

Column 1, line 19, "an" should be -- as --
Column 4, line 62, "hit" should be -- hitch --

Column 3, Line 53, after "tongue" insert -- and means extending --
Column 3, Line 53, cancel "means"

Signed and Sealed this

Eighth Day of May 1979

[SEAL]

Attest:

RUTH C. MASON
Attesting Officer

DONALD W. BANNER
Commissioner of Patents and Trademarks